(12) United States Patent
Hsi

(10) Patent No.: US 7,075,519 B2
(45) Date of Patent: Jul. 11, 2006

(54) METHOD FOR ENTERING A CHARACTER SEQUENCE INTO AN ELECTRONIC DEVICE AS WELL AS AN ELECTRONIC DEVICE FOR PERFORMING SAID METHOD

(75) Inventor: Eric Hsi, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 17 days.

(21) Appl. No.: 10/495,821

(22) PCT Filed: Nov. 14, 2002

(86) PCT No.: PCT/IB02/04785

§ 371 (c)(1),
(2), (4) Date: May 17, 2004

(87) PCT Pub. No.: WO03/044649

PCT Pub. Date: May 30, 2003

(65) Prior Publication Data

US 2005/0017952 A1  Jan. 27, 2005

(30) Foreign Application Priority Data

Nov. 20, 2001 (EP) ................................. 0120442

(51) Int. Cl.
*G09G 5/08* (2006.01)
(52) U.S. Cl. ................. 345/168; 345/157; 345/160; 345/172
(58) Field of Classification Search ........ 345/156–160, 345/168–172
See application file for complete search history.

(56) References Cited

U.S. PATENT DOCUMENTS

| | | | | |
|---|---|---|---|---|
| 5,991,396 A * | 11/1999 | Salm et al. | ............ | 379/355.09 |
| 6,005,549 A * | 12/1999 | Forest | .................. | 345/157 |
| 6,052,070 A * | 4/2000 | Kivela et al. | .......... | 341/22 |
| 6,170,000 B1 * | 1/2001 | Bories et al. | ............ | 715/535 |
| 2001/0041599 A1 * | 11/2001 | Pirkol et al. | .............. | 455/566 |

* cited by examiner

*Primary Examiner*—Vijay Shankar
(74) *Attorney, Agent, or Firm*—Edward W. Goodman

(57) ABSTRACT

In a method for entering a character sequence consisting of one or more characters into an electronic device including keys for entering keystrokes by a user as well a display panel for presenting information to the user, wherein a group of characters is presented on the display panel in the form of a matrix composed of rows and columns, at least one specific character is pointed by a cursor which is movable through the matrix, and the character sequence is constructed by pointing out consecutive characters one by one by the cursor, and the character is entered by a keystroke. In order to enter a specific character from the character sequence, the cursor moves automatically in a first direction through a specific row or column, thereby sequentially pointing out the characters in the specific row or column; the automatically moving cursor can be moved towards the column or row, respectively, of the specific character by one or more first and/or second keystrokes.

11 Claims, 2 Drawing Sheets

METHOD FOR ENTERING A CHARACTER SEQUENCE INTO AN ELECTRONIC DEVICE AS WELL AS AN ELECTRONIC DEVICE FOR PERFORMING SAID METHOD

BACKGROUND OF THE INVENTION

1. Field of the Invention

The invention relates to a method for entering a character sequence consisting of one or more characters into an electronic device, this device also comprising keys for entering keystrokes by a user as well a display panel for presenting information to the user, wherein a group of characters is presented on the display panel in the form of a matrix composed of rows and columns, wherein at least one specific character can be pointed out by means of a cursor which is movable through said matrix, and wherein the character sequence is constructed by pointing out consecutive characters in the sequence one by one by means of the cursor and entering the character in question by means of a keystroke.

The invention furthermore relates to an electronic device, for example, a portable telephone, which also comprises keys which enable a user to enter keystrokes, as well as a display panel for presenting information to the user, this device being suitable for entering a character sequence composed of one or more successive characters in accordance with the method according to the invention.

2. Description of the Related Art

Such a method and electronic device are disclosed, for example, in International Patent Application Publication No. WO 97/35413, corresponding to U.S. Pat. No. 6,052,070, which presents a mobile telephone comprising a display panel on which the digits 0–9 are presented in the form of a matrix consisting of two rows and five columns. A cursor can be moved through said matrix by means of four keys for the purpose of pointing out a particular digit, this digit then being entered by another keystroke. In this way, the user can enter a sequence of digits which forms, for example, a telephone number.

Although the number of keys in such an electronic device can be considerably reduced, the user needs to move the cursor through the matrix in order to enter a telephone number, and this movement of the cursor requires a substantial number of keystrokes.

Although the number of digits involved in the entering of numbers and figures, for example, for telephone numbers, is limited to ten, and the number of keystrokes also remains limited, the method according to the above-noted WO 97/35413, is not very suitable for entering a character sequence consisting of alphanumeric characters. In such an application, the matrix will be composed of at least the twenty-six letters of the alphabet plus the digits 0–9, which gives a 6×6 matrix, as a consequence of which, numerous keystrokes are required for moving the cursor through said extensive matrix.

SUMMARY OF THE INVENTION

The object of the present invention is to provide an improvement in comparison with the subject matter that is disclosed in WO 97/35413. More particularly, it is an object of the invention to provide a method as referred to in the introduction, which enables the user to enter a character sequence into an electronic device by means of a significantly smaller number of keys and keystrokes.

According the invention, the method for entering a character sequence into an electronic device is characterized in that in order to enter a specific character from the character sequence the cursor moves automatically in a first direction through a specific row or column, thereby sequentially pointing out the characters in said row or column, and in that the automatically moving cursor can be moved towards the row or column of the specific character by means of one or more first and/or second keystrokes. In this manner the number of keystrokes to be entered by the user is significantly reduced, resulting in a reduced physical burden on the user, while, in addition an electronic device implementing the method according to the invention can be provided which comprises a considerably smaller number of keys.

According to the invention, it is possible to realize an even more simplified maneuvering of the cursor through the matrix in that it is possible to change the automatic movement of the cursor through the matrix from the first direction of movement into a second direction of movement, opposing said first direction of movement, by means of at least one third keystroke and/or at least one fourth keystroke.

In order to effect a simple entry of a desired character from the matrix, the movement of the cursor in the row or column in question is interrupted by means of a fifth keystroke. The character pointed out by the cursor can then be entered into the electronic device by means of another first keystroke.

Presentation of the alphanumerical character pointed out by the cursor can take place in upper case or in lower case, which can be effected by means of a second keystroke. Furthermore, the character that has been entered last can be deleted by means of a third keystroke or a space can be entered by means of a fourth keystroke.

After the alphanumerical character in question has been entered, the automatic movement of the cursor in the row or column in question can, according to the invention, be resumed by means of a second fifth keystroke.

A simplified as well as ergonomically improved electric device in which the method according to the invention is implemented can be obtained in that, in accordance with the invention, said third and said fourth keystrokes can be entered with one and the same key. The allocation of different entry functions to the same key makes it possible to realize this simplification.

BRIEF DESCRIPTION OF THE DRAWINGS

The invention will now be explained in more detail with reference to the accompanying drawings, in which.

DESCRIPTION OF THE PREFERRED EMBODIMENTS

Figure 1:
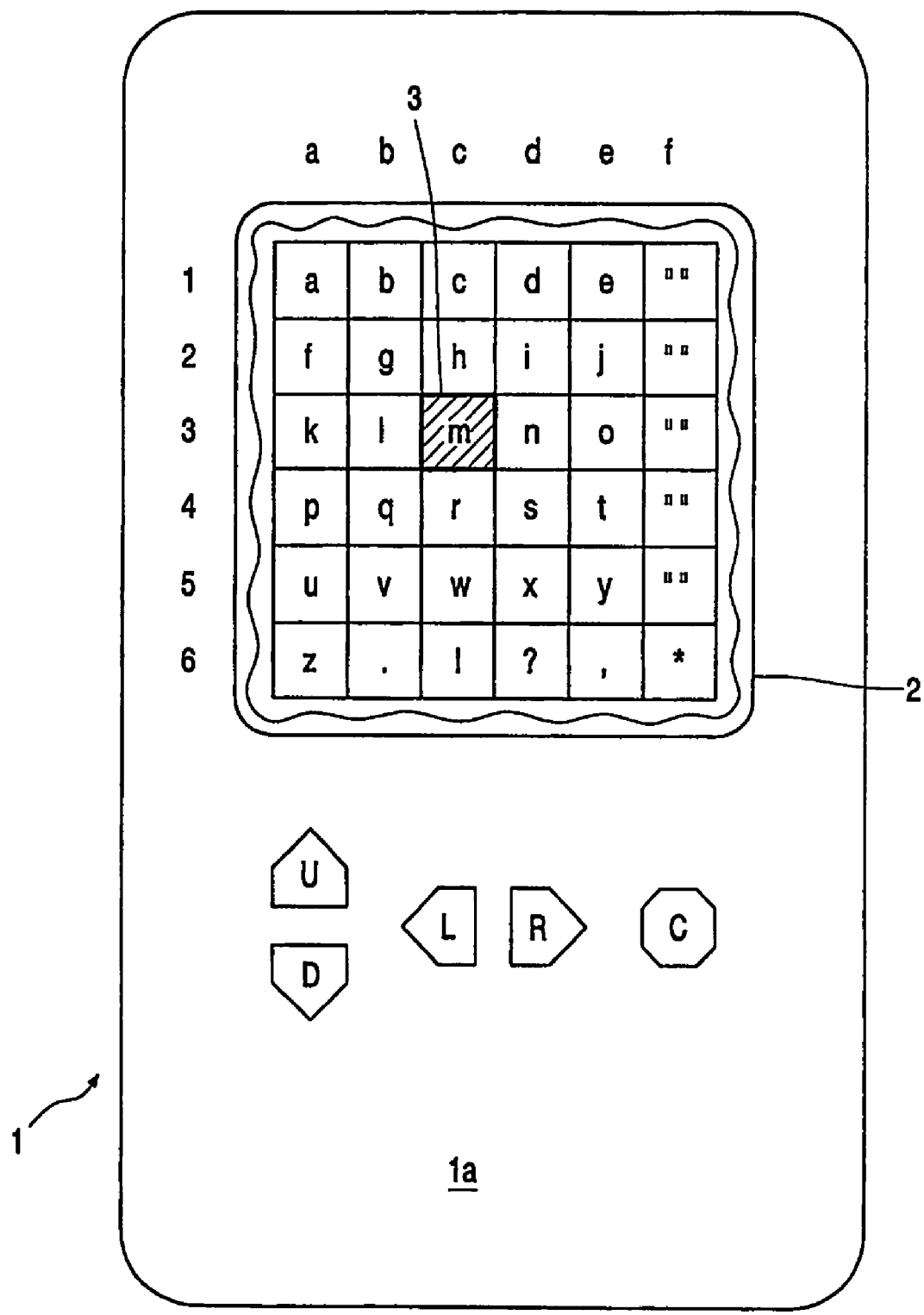
FIG. 1 is a schematic representation of an embodiment of the method according to the invention.

FIG. 1 shows a (part of an) electronic device 1 having, on the front side 1a, a display panel 2, for example, an LCD screen. Alphanumerical keys are presented on the display panel 2 in the form of a 6×6 matrix, which is, in this embodiment, constructed of rows 1–6 and columns a–f. In this example, the alphanumerical characters of this matrix consist of the twenty-six letters of the alphabet, the punctuation marks ".", "!", "?", "," as well as a specific control character "*". Column f consists mainly of spaces " " whose function will be explained hereafter.

Furthermore, a cursor 3 is presented in the matrix on the display panel 2, this cursor pointing out a character, for example, in reverse video; in the figure, the letter "m" is pointed out in row 3, column c. The cursor can also point out a character in the matrix in another way, for example, by causing said character to blink or by accentuating the edges of the matrix cell (3, c) being indicated.

Furthermore, five keys U, D, L, R and C are present on the front side of the electronic device 1.

Although only part of the electronic device will be explained in the present description of the figures, the electronic device may be a "personal digital assistant", for example, or a mobile telephone or a TV-set co-operating with a separate remote control console provided with keys.

Although a 6×6 matrix is shown in the figures, it will be apparent that the matrix used in the implementation of the method according to the invention may have any form as regards the number of rows and/or columns. The matrix can be extended, for example, with the digits 0–9. Furthermore, specific matrix cells of the matrix can be pointed out by means of a figure or an icon or a control character presented otherwise, the user can then instruct the electronic device to carry out a specific task by energizing the matrix cell in question. Such control characters may be programmed by the user, for example, to call a specific telephone number or to carry out a specific task, such as starting an electronic memo book management program.

In accordance with the method according to the invention, the cursor 3 moves automatically through a row or a column of the matrix. In the examples illustrated in the figures, the cursor 3 moves automatically either in the horizontal direction through row 3 or in the vertical direction through column c. The moving cursor 3 sequentially points out the characters in the respective row or column. The user can maneuver the automatically moving cursor through the matrix by means of keys U and D, respectively; the user can move the cursor one row upwards or one column to the left by striking the key U. Likewise, the user can move the cursor 3 one row downwards or one column to the right by striking the key D. The user can thus maneuver the cursor 3 through a matrix composed of a considerable number of rows and columns while using a considerably smaller number of keystrokes in comparison with the application disclosed in the previously discussed International patent publication WO 97/35413.

In accordance with the invention, the electronic device also comprises a key C enabling the user to interrupt the movement or animation of the cursor 3 through the matrix, for example, when the character to be entered is being pointed out by the cursor 3.

According to the invention, the various keys U, D, L and R are furthermore allocated a different function in this interrupted state. In the interrupted state (that is, after the key C has been depressed once), the key D can, for example, be used to enter the character in question, while the key U is linked to the function "upper case/lower case". Pressing the key U will convert the character being pointed out from upper case to lower case and vice versa. The key L, which has been allocated a deleting function, can be used to delete the character in question or the character that has been entered last. The key R can be used for entering a so-called space.

The interrupted state is terminated by pressing the key C again, after which the cursor 3 will continue its movement or animation through the matrix in the column or row in question. To this end, the keys U and D are allocated their original function again, that is, moving the automatically moving cursor 3 up or down or to the left or to the right through the matrix.

In the animation state, the keys L and R are used to set the direction of movement of the cursor 3 through the matrix. The key R can be used to set the direction of movement of the cursor 3 through the matrix "from the left to the right" or "downwards from above", while the key L is used to set the direction of movement of cursor 3 "from the right to the left" or "upwards from below". Striking one of the two keys L or R enables the user to move quickly and efficiently through the matrix, i.e., with fewer keystrokes.

Although the arrangement of the alphanumeric characters in the matrix according to FIG. 1 is given merely by way of example, and all kinds of different arrangements are possible, including digits 0–9, several spaces are included in column f for ease of operation. The user can thus enter a space more quickly, for example, after having entered a word, the user thus need not maneuver the cursor 3 to the only matrix cell that represents a "space" each time a space must be entered. This also leads to a significant reduction of the number of keystrokes necessary, for example, for entering a sentence.

In another embodiment of the method according to the invention (again see FIG. 1), the cursor 3 automatically moves through the matrix in a specific row or column; the user can move the cursor 3 up or down or to the left or to the right by means of the keys U and D, respectively. In this second embodiment, however, the keys L, R and C have been allocated different functions. The user can directly enter the character being pointed out by the cursor while the cursor 3 is moving through the matrix by pressing the key C. In contrast to the above-described embodiment, the user need not to interrupt the animation of the cursor 3 first, so that the entering of characters by the user can take place much more quickly, with fewer keystrokes being required.

After the key C has been struck, the character indicated by the cursor 3 is directly entered, after which the animation or the movement of the cursor 3 through the matrix is automatically continued. The Key R can be used to reverse the direction of movement of the cursor 3 "from left to right" into "from right to left" or "downwards from above" into "upwards from below". The key L is now linked to the interruption function in the situation where the user wishes to perform another operation.

In the interruption state (that is, after the key L has been struck), different functions are allocated to the keys U, D, L and R. Furthermore in the interruption state, the key C is used for entering the character indicated by the stationary cursor. The key U can be used to present the character in question in upper case or in lower case, while the key R can be used to delete the character entered last. The key R is used for entering a space, while the key D is used to resume the animation of the cursor 3 through the matrix.

In this embodiment, the entering of a character can take place much more quickly, while, in addition, it is possible to allocate different functions to the keys in the various operating states or to allocate different functions to one key in one operating state. This makes it possible to fit an electronic device implementing the method according to the invention with a considerably smaller number of keys.

Figure 2:
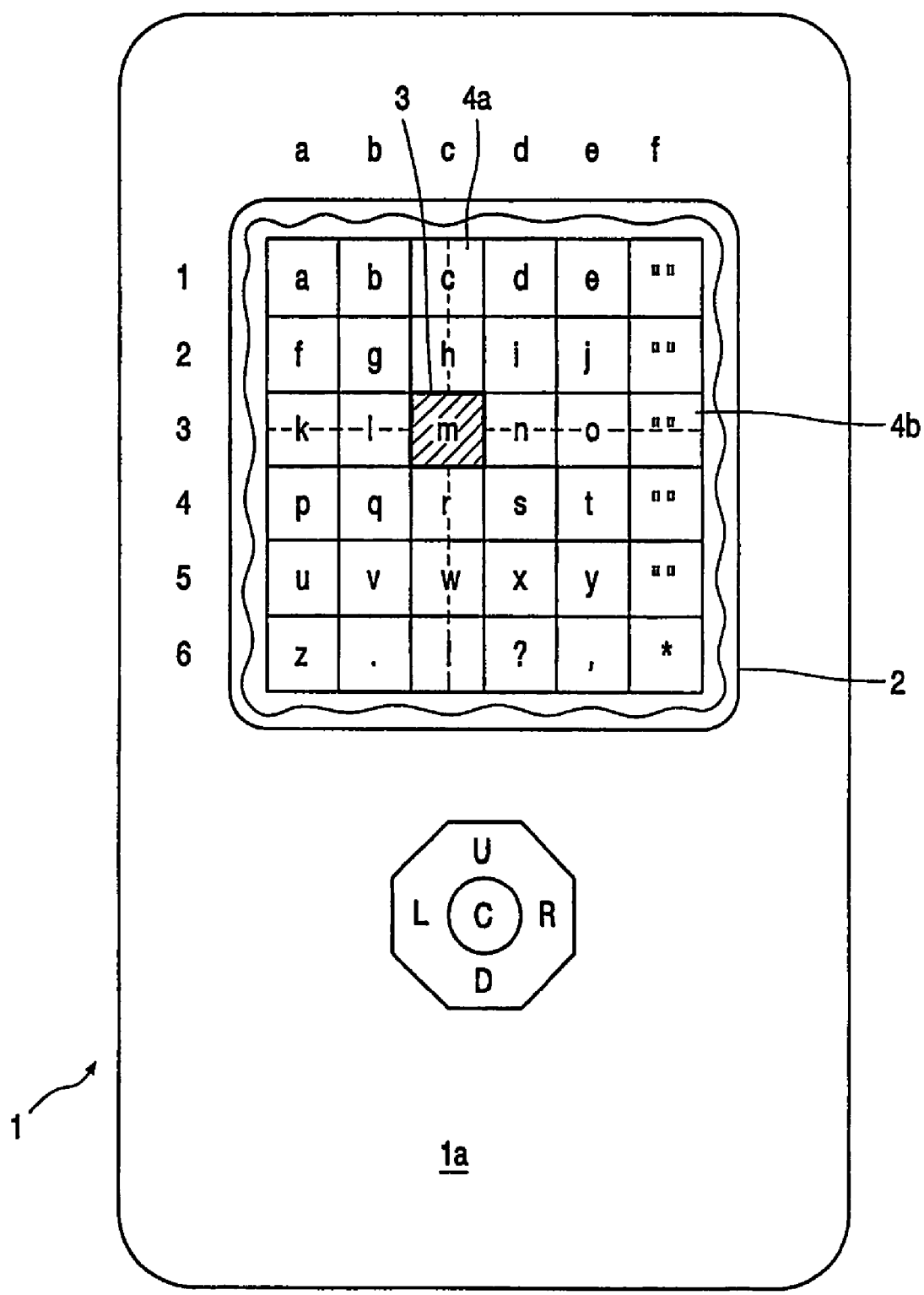
FIG. 2 shows another embodiment of the method according to the invention.

FIG. 2 shows a different embodiment of an electronic device which implements the method according to the invention. In this embodiment, the keys U, D, L, R and C are integrated in one key, which is in the form of a so-called rotary button or rocker button in the present embodiment. This enables the user to operate the electronic device with a thumb, so that the entering of characters takes place much more quickly, which thus enhances the ergonomic ease of operation of the electronic.

FIG. 2 furthermore discloses a different presentation of the cursor 3 by means of lines of intersection 4a and 4b.

It will be apparent that the method according to the invention, which employs a cursor which moves automatically through a matrix, makes it possible to use a significantly smaller number of keystrokes for entering characters into an electronic device implementing the method according to the invention. The additional creation of different operating states, wherein a different function can be allocated to a key, enables a further simplification of an electronic device in that the user can then enter a character sequence while using fewer keys and/or keystrokes.

A 'computer program' is to be understood to mean any software product stored on a computer-readable medium, such as a floppy-disk, downloadable via a network, such as the Internet, or marketable in any other manner.

The invention claimed is:

1. A method for entering a character sequence consisting of one or more characters into an electronic device, said electronic device having keys for entering keystrokes by a user and a display panel for presenting information to the user,
    wherein a group of characters is presented on the display panel in the form of a matrix composed of rows and columns,
    wherein at least one specific character can be pointed out by a cursor movable through said matrix, and
    wherein the character sequence is constructed by pointing out consecutive characters in the sequence one by one by the cursor and entering the pointed out character by a keystroke,
    characterized in that said method comprises the steps of
    automatically moving the cursor in a first direction through a specific row or column, thereby sequentially pointing out the characters in said row or column; and
    moving the automatically moving cursor towards a specific column or row, respectively, containing the specific character by one or more first and/or second keystrokes.

2. The method as claimed in claim 1, characterized in that the method further comprises the step of:
    changing the automatic movement of the cursor through the matrix from the first direction of movement into a second direction of movement, opposing to said first direction of movement, by at least one third keystroke and/or at least one fourth keystroke.

3. The method as claimed in claim 1 or 2, characterized in that the method further comprises the step of:
    interrupting the automatic movement of the cursor in the row or column by a fifth keystroke.

4. The method as claimed in claim 1, characterized in that said method further comprises the step of:
    entering the character pointed out by the cursor by a first keystroke.

5. The method as claimed in claim 3, characterized in that the method further comprises the step of:
    changing the displayed case, from upper to lower case, or vice versa, of the character pointed out by the cursor by a second keystroke.

6. The method as claimed in claim 4, characterized in that the method further comprises the step of:
    deleting the character entered last by a third keystroke.

7. The method as claimed in claim 6, characterized in that the method further comprises the step of:
    entering a space by a fourth keystroke.

8. The method as claimed in claim 3, characterized in that said method further comprises the step of:
    resuming the automatic movement of the cursor in the row or the column by a second keystroke.

9. The method as claimed in claim 7, characterized in that the same key is used for said third and said fourth keystroke.

10. An electronic device comprising keys for enabling a user to enter keystrokes, and a display panel for presenting information to the user, said electronic device being suitable for entering a character sequence composed of one or more successive characters, and comprises means for presenting a group of characters on said display panel in the form of a matrix composed of rows and columns, and means for pointing out at least one specific character using a cursor movable through said matrix, characterized in that in order to enter a specific character from the character sequence, said electronic device comprises:
    means for moving the cursor automatically in a first direction through a specific row or column, the cursor thus sequentially pointing out the characters in said row or column; and
    means for moving the automatically moving cursor to the column or row, respectively, containing the specific character by one or more first and/or second keystrokes of said keys.

11. A computer program product enabling a programmable device when executing said computer program product to function as a device as defined in claim 10.

* * * * *